US012432648B2

(12) United States Patent
Pabla et al.

(10) Patent No.: US 12,432,648 B2
(45) Date of Patent: Sep. 30, 2025

(54) WIRELESS SENSOR NETWORK

(71) Applicant: Arbinder Pabla, Livermore, CA (US)

(72) Inventors: Arbinder Pabla, San Jose, CA (US); Van Hoang Nguyen, Senneville (CA)

(73) Assignee: Arbinder Pabla, Livermore, CA (US)

(*) Notice: Subject to any disclaimer, the term of this patent is extended or adjusted under 35 U.S.C. 154(b) by 322 days.

(21) Appl. No.: 18/110,369

(22) Filed: Feb. 16, 2023

(65) Prior Publication Data
US 2023/0262587 A1 Aug. 17, 2023

Related U.S. Application Data

(60) Provisional application No. 63/268,127, filed on Feb. 16, 2022.

(51) Int. Cl.
| | |
|---|---|
| *H04W 4/00* | (2018.01) |
| *H04W 4/38* | (2018.01) |
| *H04W 48/16* | (2009.01) |
| *H04W 72/0453* | (2023.01) |
| *H04W 88/08* | (2009.01) |

(52) U.S. Cl.
CPC ............ *H04W 48/16* (2013.01); *H04W 4/38* (2018.02); *H04W 72/0453* (2013.01); *H04W 88/08* (2013.01)

(58) Field of Classification Search
CPC .... H04W 48/16; H04W 4/38; H04W 72/0453
USPC ........................................................ 370/338
See application file for complete search history.

(56) References Cited

U.S. PATENT DOCUMENTS

| | | | |
|---|---|---|---|
| 7,620,396 B2 | 11/2009 | Floam et al. | |
| 10,327,152 B2 | 6/2019 | Sunay et al. | |
| 10,743,202 B2 | 8/2020 | Yerramalli et al. | |
| 2014/0355476 A1 | 12/2014 | Anderson et al. | |
| 2019/0045370 A1 | 2/2019 | Al-Fanek et al. | |
| 2020/0019926 A1* | 1/2020 | Ayoub ................... | H04W 4/40 |

(Continued)

OTHER PUBLICATIONS

Notification of Transmittal of the International Search Report and the Written Opinion of the International Search Authority and International Search Report issued May 31, 2023 in corresponding International Patent Application No. PCT/US2023/013191, 5 pages.

(Continued)

*Primary Examiner* — Temica M Beamer
(74) *Attorney, Agent, or Firm* — XSENSUS LLP

(57) ABSTRACT

A wireless networking infrastructure includes at least one multiple radio access point or base station including at least one radio that operates on a first radio communications protocol at a first frequency spectrum, and a second radio that operates on a second radio communication protocol at a second frequency spectrum; at least one remotely deployable wireless sensor; and a wireless network controller configured to establish connection with one or more of the at least one multiple radio access point or base station to form a wireless network operating at the first frequency spectrum, establish specific geolocations of the at least one multiple radio access point or base station and of the at least one remotely deployable wireless sensor, and receive and store radio operating parameters for radios operating at the first frequency spectrum at the specific geolocations.

20 Claims, 9 Drawing Sheets

(56) References Cited

U.S. PATENT DOCUMENTS

2023/0078563 A1\* 3/2023 Salkintzis ............ H04W 60/04
455/435.1

OTHER PUBLICATIONS

Written Opinion of the International Searching Authority issued May 31, 2023 in corresponding International Patent Application No. PCT/US2023/013191, 4 pages.

\* cited by examiner

WIRELESS SENSOR NETWORK

CROSS-REFERENCE TO RELATED APPLICATION

This application claims the benefit of U.S. Provisional Application No. 63/268,127, filed Feb. 16, 2022, which is incorporated herein by reference in its entirety. This application is related to U.S. application Ser. No. 17/118,160, filed Dec. 10, 2020, which is incorporated herein by reference in its entirety.

FIELD OF THE DISCLOSURE

The present disclosure relates to an apparatus and associated methodology for wireless sensor networks.

BACKGROUND

Wireless connectivity to devices can be provided using wireless spectrum that is licensed, unlicensed, or in certain situations may be shared by a tiered priority of multiple users. Wi-Fi technology as specified under the IEEE 802.11 standard is an example of unlicensed spectrum connectivity. Cellular wireless networks using technology such as 3G, 4G and 5G under the 3GPP specifications are an example of licensed spectrum networks. Citizens Broadband Radio Service (CBRS) is an example of shared spectrum usage.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a wireless networking infrastructure includes at least one multiple radio access point or base station including at least one radio that operates on a first radio communications protocol at a first frequency spectrum, and a second radio that operates on a second radio communication protocol at a second frequency spectrum; at least one remotely deployable wireless sensor including at least one wireless sensor sensing radio frequency parameters at the first frequency spectrum of its vicinity, and a transceiver that transmits and receives radio communications at the second frequency spectrum; and a wireless network controller configured to establish connection with one or more of the at least one multiple radio access point or base station to form a wireless network operating at the first frequency spectrum, configure one or more of the at least one remotely deployable wireless sensors to sense one or more radio frequency parameters at the first frequency spectrum, receive radio frequency parameter data from the one or more remotely deployable wireless sensors via the at least one multiple radio access point or base station, establish specific geolocations of the at least one multiple radio access point or base station and of the at least one remotely deployable wireless sensor, and receive and store radio operating parameters for radios operating at the first frequency spectrum at the specific geolocations.

In one aspect, the first radio is a 5G capable radio operating at the first frequency spectrum which falls within at least one of operating frequencies of one or more licensed millimeter wave frequency bands at its geolocation.

In one aspect, the second radio is a Wi-Fi radio at the second frequency spectrum which falls within one of the unlicensed Wi-Fi frequency bands applicable at its geolocation.

In one aspect, the radio operating parameters are licensed radio operating parameters.

In one aspect, the radio operating parameters are sub-licensed radio operating parameters.

In one aspect, wherein the wireless network controller is further configured to perform authentication of a wireless sensor joining the wireless sensor network.

In one aspect, the wireless network controller is further configured to determine a maximum transmit power of each mm-wave radio that is installed within a perimeter of a private network prescribed by a sublicense.

According to aspects of the disclosed subject matter, a method of deploying a licensed spectrum wireless network includes deploying at least one multiple radio access point or base station having a first radio operating at a licensed frequency and at least one a second radio operating at an unlicensed frequency within a territory of a license or sub-license to licensed radio frequency; sensing, by a plurality of remote wireless sensors, one or more radio frequency parameters at the licensed frequency; establishing geolocations of the at least one multiple radio access point or base station; establishing the geolocations or locations of the plurality of remote wireless sensors relative to the at least multiple radio access point or base station; using radio frequency parameter data from the plurality of remote wireless sensors to determine upper operating bounds of the at least one multiple radio access points or base stations operating at the licensed frequency at its specific geolocation in accordance with an applicable radio spectrum license or sub-license operating term; and configuring or reconfiguring the at least one multiple radio access point or base station so as to operate within the upper operating bounds applicable to use of the licensed frequency at its specific geolocation.

According to aspects of the disclosed subject matter, a wireless network controller, the wireless network controller having circuitry configured to establish connection with one or more multiple radio access points or base stations to form a wireless network operating at a first frequency spectrum, sense, by one or more remotely deployable wireless sensors, one or more radio frequency parameters at the first frequency spectrum, receive radio frequency parameter data from the one or more remotely deployable wireless sensors via the one or more multiple radio access points or base stations, establish specific geolocations of the one or more multiple radio access points or base stations and of the one or more remotely deployable wireless sensors, and receive and store radio operating parameters for radios operating at the first frequency spectrum at the specific geolocations.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
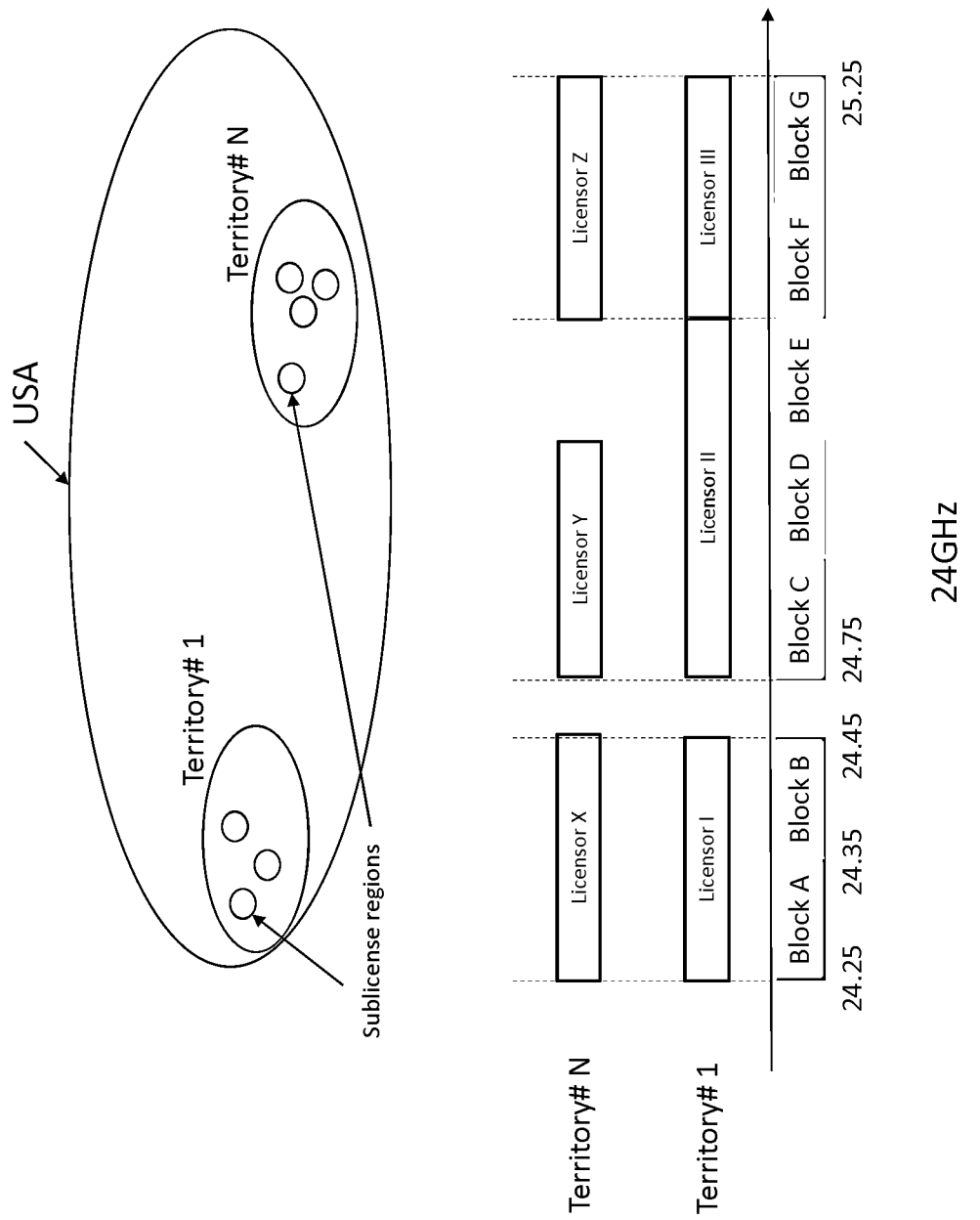
FIG. 1 illustrates an exemplary depiction of mm-wave spectrum band in the vein of FCC Auction 102 according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Generally speaking, private wireless networks are wireless networks that are set up to operate privately in the sense that that they are localized to a private space and provide access to a set of privately approved user devices. Private wireless networks may be established using local networking infrastructure using portions of the radio frequency spectrum that is either unlicensed, shared, or licensed. A Wi-Fi network is an example of a private wireless network operating in unlicensed spectrum frequencies; a CBRS network is an example of a private wireless network on a shared spectrum frequency band, and 4G or 5G private networks are commonly understood to be private wireless networks on a licensed spectrum frequency band. In the latter category, the wireless infrastructure for the private network using licensed spectrum may operate in a portion of that spectrum being used by a public cellular network operator having primary rights to the licensed spectrum in that local area. The operator of the private wireless network may further obtain rights to lease or sublicense a portion of the licensed spectrum for its own private use from the primary spectrum licensor of the spectrum who may concomitantly be providing a public cellular network service where the private wireless network is deployed. This right to use and operate a wireless private network infrastructure locally on a portion of, or all of, the spectrum from a primary spectrum licensor is a sub-lease or sublicense (the "spectrum sublicense"). The spectrum sublicense may be operationally limited to a prescribed geographical location and area (hereafter also referred to as the "network coverage area"), may be temporally limited, and may be limited in other ways within the general provisions of the sublicense terms. If the RF characteristics of a radio device used in the private wireless network infrastructure within the network coverage area can be modified during or between the period of its operation, or if said radio device is approved for operation only within specified operating parameters, it may be desirable for the operation of radio device(s) to be assessable for operational compliance with respect to the spectrum sublicense. The first modality for assessing this compliance is direct from measurements of the radio frequency device. More specifically, as further described herein, an alternative approach, a wireless sensor system and method for indirectly assessing compliance of the RF characteristics of radio device(s) and, if required, enforcing compliance of a radio device if the operation of said radio device falls out of prescribed operating bounds of the spectrum sublicense under which it is required to operate.

In other words, private wireless networks may operate on radio frequency spectrum that is subject to spectrum license constraints, and operating constraints further specified by the primary spectrum licensor to the operator of the private wireless network. It would be advantageous for the private wireless network's compliance with operating constraints to be monitored or assessed and for the RF from specific radio frequency transmitters of the private wireless network system to be assessable using means external to the radio frequency transmitter. For example, as further described herein, various aspects of the disclosed subject matter include a plurality of RF sensors deployed within and/or at the proximate edge of a private wireless network area of coverage; for the RF sensors to have particular RF sensing capabilities; for the RF sensors to connect to one or more system elements of the private wireless network; and for particular modes of operation of the wireless sensor network independent of and/or operate in conjunction with the private wireless network.

It should be appreciated that various refinements of the features described herein may exist in relation to various aspects of the present disclosure. Further features may also be incorporated in these various aspects as well. These refinements and additional features may exist individually or in any combination. For instance, various features discussed herein in relation to one or more of the illustrated embodiments may be incorporated into any of the one or more aspects of the present disclosure alone or in any combination.

Referring now to the drawings, wherein like reference numerals designate identical or corresponding parts throughout the several views:

FIG. 1 depicts, by way of example, wireless spectrum allocations in the 24 GHz radio frequency band, broadly similar to spectrum license Auction 102 by the FCC in the USA, giving respective licenses to licensors (also referred to as primary licensors, hereafter) in designated blocks of spectrum. For licensing purposes, such as exemplified in the USA spectrum auctions, primary spectrum licenses can be defined into discrete territories (otherwise termed partial economic areas, in the United States). More than one primary spectrum licensor may obtain rights to one or more than one spectrum block (each block could be of 100 MHz bandwidth). A primary licensor may, if the primary license terms and regulations in the country so permit, further partition and disaggregate the licensed spectrum within the territory of the license to any number of third-party operators (who may also be sublicensors of all or a portion of the primary spectrum) within the territory. In such instance, each "microoperator" (being a party in direct control of a radio device operating within the spectrum block(s)) may not exceed the signal level and radio emission specifications for the particular spectrum block required by the primary license terms or other regulations within the country. Generally, a microoperator will also be the sublicensor of the spectrum block(s). For generality throughout this disclosure, wherever reference is made to spectrum frequency f0, it should be understood that the entire spectrum of radio frequencies within the spectrum block containing f0 is being referenced. Hereafter, the term spectrum sublicense can be used interchangeably with the term spectrum microlicense.

Figure 2:
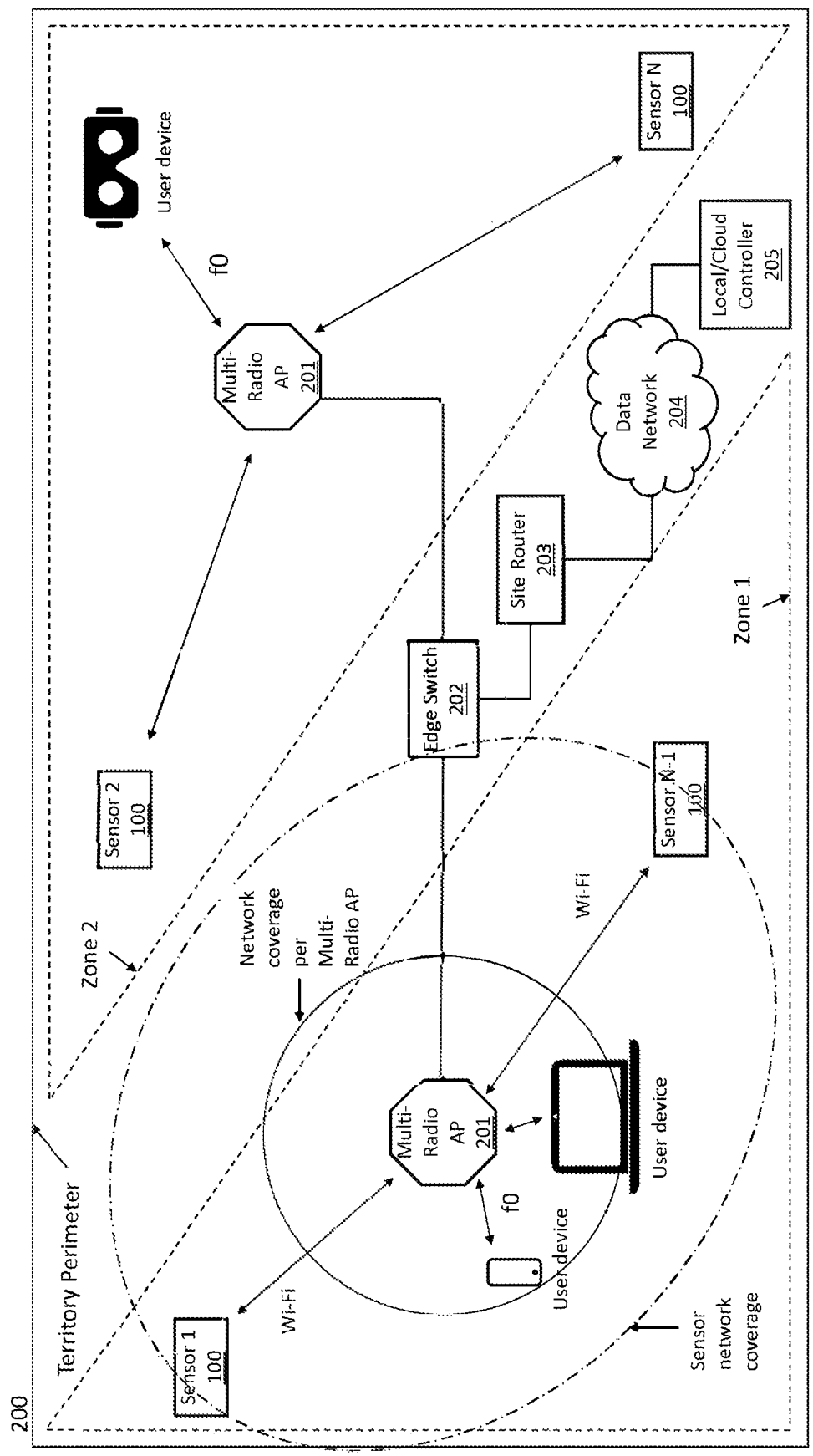
FIG. 2 illustrates a wireless sensor network overlay with a wireless communications network according to one or more aspects of the disclosed subject matter.

FIG. 2 depicts a territory of a private network defined by a perimeter 200 with at least one multi-radio wireless access point 201, at least one user device, and at least one wireless sensor 100. Multi-radio access point 201 can provide wireless connectivity using at least two radios, wherein a first radio operates on a first protocol and a first RF spectrum frequency in a first spectrum band, and at least a second radio operates on a second protocol and a second RF spectrum frequency, which may be different from the first protocol of the first radio and on a second spectrum band. Communication protocols and related spectrum bands may include, but are not limited to: Wi-Fi, LoRaWAN, Bluetooth, Sigfox, fifth generation (5G) operating at sub-6 GHz, 24 GHz, 28 GHz, etc. The term radio as used herein includes a wireless transceiver or receiver through to the connected antenna(s), and any RF components or elements between transceiver and connected antenna(s). FIG. 2 depicts for the purpose of illustration, and without loss of generality, multi-radio access point 201, in which a first radio is a millimeter wave radio (hereafter mm-wave radio) operating at frequency f0 such as 24 GHz, 28 GHz and higher frequencies generally understood to be millimeter wave, and at least a second radio being a Wi-Fi radio. In an embodiment the operating range of the second (Wi-Fi) radio from the multi-radio access point 201 preferentially extends beyond the operating range of first radio (mm-wave) at frequency f0 from the same multi-radio access point 201 within a given physical zone, i.e. zone 1 or zone 2 as illustrated in FIG. 2. For example, if mm-wave radio of frequency f0 extends to 100 feet in a given direction, the Wi-Fi signal extends to at least or greater than 100 feet in the same direction. In an embodiment, the first radio of multi-radio access point 201 complies with the stricter of two operating radiative RF power limits: a first limit being a regulatory limit for radio devices of frequency f0 in the installed environment, and any second limit (lower than the regulatory limit) as to radio(s) operating at f0 in the installed environment. In the instance where second radio is a Wi-Fi radio there is a radiative power limit (regulatory limit) that sets the effective range of the second radio, but otherwise there is no practical territorial limit within a country for Wi-Fi unlicensed spectrum use (other than a distinction between indoor and outdoor use that may exist for Wi-Fi operation). However, in the instance where the first radio is at frequency f0 and f0 is a licensed frequency, operational use of frequency f0 is defined by the territorial limits of a spectrum license for f0 to those users/radio devices that have rights via the license to operate at this frequency f0, such that the radio complies at all times with the territorial limits restricting the use of radios at that frequency f0. Such territorial limits may be set by a governmental regulator through a primary license to frequency f0 in defined territories, such as depicted in FIG. 1., or by other terms, such as a derivative license or sublicense to the primary spectrum license, if applicable. In the instance where the territorial limit of f0 is set by a sublicense, the (sublicense) territory may be a fractional area of the territory available to the primary license for f0, such as depicted in FIG. 2. as territory 200.

In reference to FIG. 2, a plurality of wireless sensors 100, are located within the coverage area of second Wi-Fi radio of multi-radio access point 201, and each wireless sensor 100 connects to one or more multi-radio access points 201, and each multi-radio access point 201 connects to one or more wireless sensors 100, so as to exchange either control data or sensor data with the associated multi-radio access point 201 over the Wi-Fi radio link. In an embodiment wireless sensor 100, senses RF signal from full 3D space; in another embodiment wireless sensor 100 senses RF signal at f0 from a limited solid angle volume of the full 3D space toward a specific multi-radio access point 201, so as not to integrate RF from remaining full 3D space and thereby obtain an improved measure of RF signal power emanating from a specific radio emitting at f0. In an embodiment the upper limit to the radiative power of a first radio operating at millimeter wave frequency f0 is established by the method disclosed herein using one or more wireless sensors 100 deployed and connected in this manner to multi-radio access point 201.

In a further embodiment, the walls of the building in which the network of FIG. 2. is installed establish the territory 200 of a spectrum microlicense and wireless sensors 100 are placed at or near the perimeter to the territory 200. In another embodiment, a plurality of wireless sensors 100, are affixed to the exterior walls of a building in such a manner as to sense RF signal at f0 emanating from the interior of the building, wherein the multi-radio access point 201 is situated. In another embodiment, a first radio of the multi-radio access points 201 provisions wireless connectivity services on the spectrum f0 made available within the territory 200 via the spectrum microlicense, and a second radio of the multi-radio access points 201 provisions connectivity to the wireless sensors 100. In this manner, a plurality of multi-radio access points 201 can be networked so as to enable the effective juxtaposition of a first network for wireless connectivity to user devices at f0 and a second (wireless sensor) network comprising a plurality of sensors 100 within and at the proximate edge of the coverage area of the first network for the purpose of monitoring and informing the control of the first network by the second network.

Figure 3A:
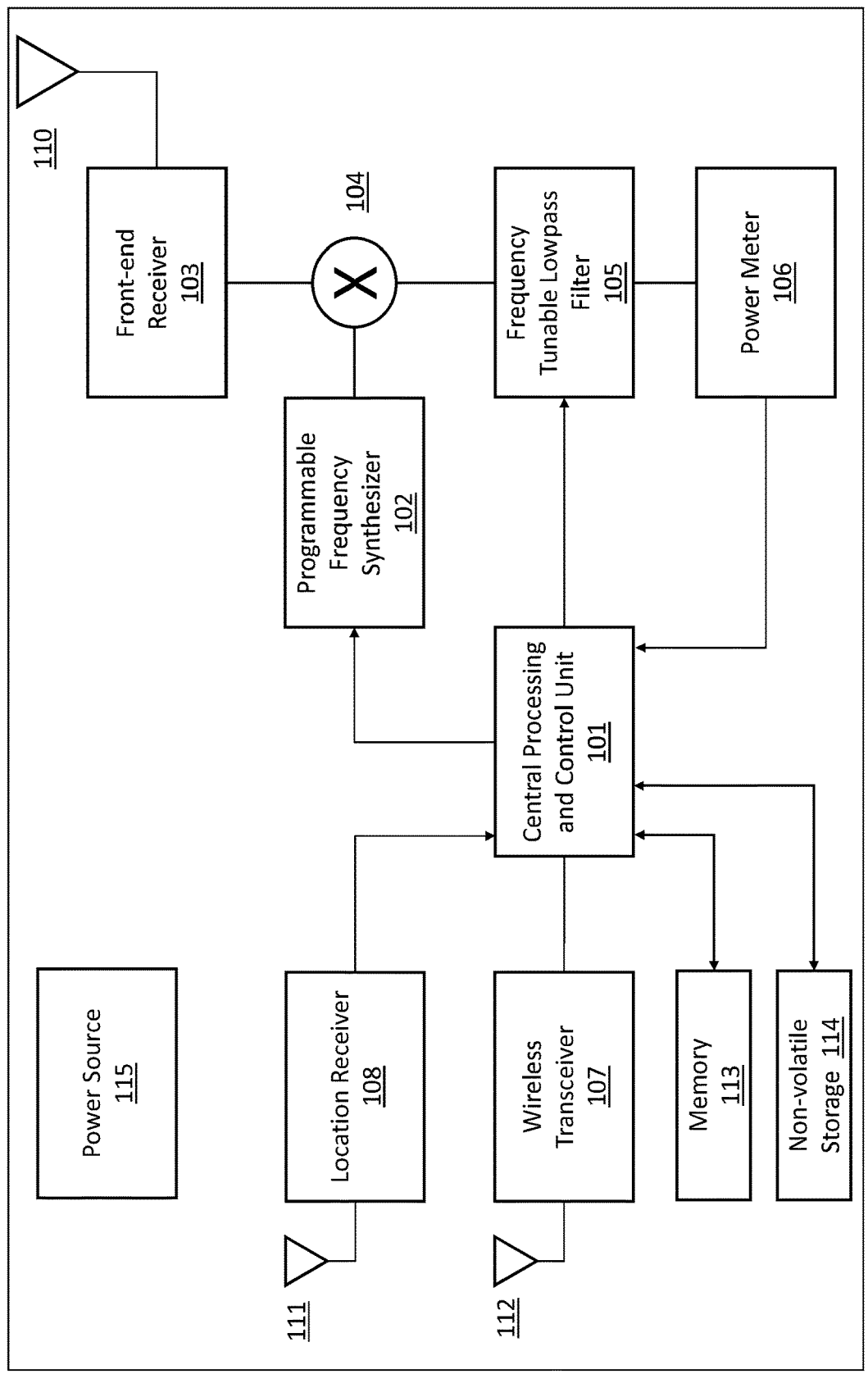
FIG. 3A illustrates a first embodiment of a wireless sensor module unit according to one or more aspects of the disclosed subject matter.

FIG. 3A depicts one embodiment of a wireless sensor 100. Wireless sensor 100 may include, among other things, one or more of processor(s) and control unit 101, memory 113, nonvolatile storage 114, a wireless transceiver 107, a GPS receiver 108, a programmable frequency synthesizer 102, a RF mixer 104, a front-end receiver 103, antennas 110, 111, 113 coupled to respective transceiver and receivers 103, 108, 107, a frequency selective bandpass filter 105, a RF power meter 106, and a power source 115. The various functional blocks shown in FIG. 3A may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The machine-readable instructions may be executed by the processor 101 and may cause the control unit 101 to perform control operations as described herein.

Wireless sensor 100 senses the RF environment in a specified frequency band, centered on frequency f0, with a finite frequency spectrum bandwidth (BW) around frequency f0. By way of example, using the spectrum depicted in FIG. 1. for illustration, and without limitation as to frequency, wireless sensor 100 is configured to sense the integrated radiative power level with center frequency f0 of 24.30 GHz, with frequency bandwidth of 100 MHz. The central processing and control unit 101 receives information of the center frequency f0 of 24.30 GHz and frequency bandwidth of 100 MHz from an associated multi-radio wireless access point 201 through an integrated wireless transceiver 107 of the wireless sensor 100. The wireless transceiver 107 includes a transmitter and a receiver, which can be of any wireless technologies suitable for local or wide area network such as Wi-Fi, Bluetooth, LoRa, Sigfox, 802.15.4, cellular 3G/4G/5G. In an embodiment, the wireless transceiver 107 is a Wi-Fi transceiver operating in unlicensed spectrum of 2.4 GHz/5 GHz/6 GHz band. In a further embodiment, wireless transceiver 107 establishes a connection to one multi-radio access point 201, of FIG. 2. The central processing and control unit 101 compares the received center frequency 24.30 GHz and frequency bandwidth 100 MHz with a look-up table stored in the non-volatile storage 114 and retrieves corresponding control voltages Vf0 and Vbw for the center frequency 24.30 GHz and frequency bandwidth 100 MHz, respectively. The central processing and control unit 101 applies Vf0 to the programmable frequency synthesizer 102 so as to generate the same center frequency f0 24.30 GHz for the LO input of mixer 104. Similarly, central processing and control unit 101 applies Vbw to tunable lowpass filter 105, so as to set its lowpass bandwidth equal to 100 MHz.

Once the frequency synthesizer 102 and lowpass filter 105 are programmed, the wireless sensor 100 operates as follows. The front-end receiver 103 senses a RF signal at frequency f0 of 24.30 GHz present at the sensor location through a wideband antenna 110. The front-end receiver 103, includes one or several bandpass filters operating at the 24 GHz, 28 GHz, and higher frequency bands and a wideband low noise amplifier further amplifies the sampled RF signal to meet the required RF input amplitude threshold of mixer 104. Since the LO port of mixer 104 is presented with a signal having the same centered frequency f0 of 24.30 GHz, the received RF signal is direct down-converted to baseband frequency. The power meter 106 captures the received RF signal at frequency f0, converts the received signal strength to an equivalent voltage level, and provides this voltage level to central processing and control unit 101.

The wireless sensor of FIG. 3A further includes a power source 115, which provides electrical power to all components of the sensor. The power source can either operate from grid or off-grid. For off-grid operation, the power source 115 can get power from installed batteries or other renewable energy, such as solar, thermal, wind energy or means of harvesting of energy from the RF environment. Such energy source flexibility permits the low maintenance and long operation life of wireless sensor 100.

Figure 3B:
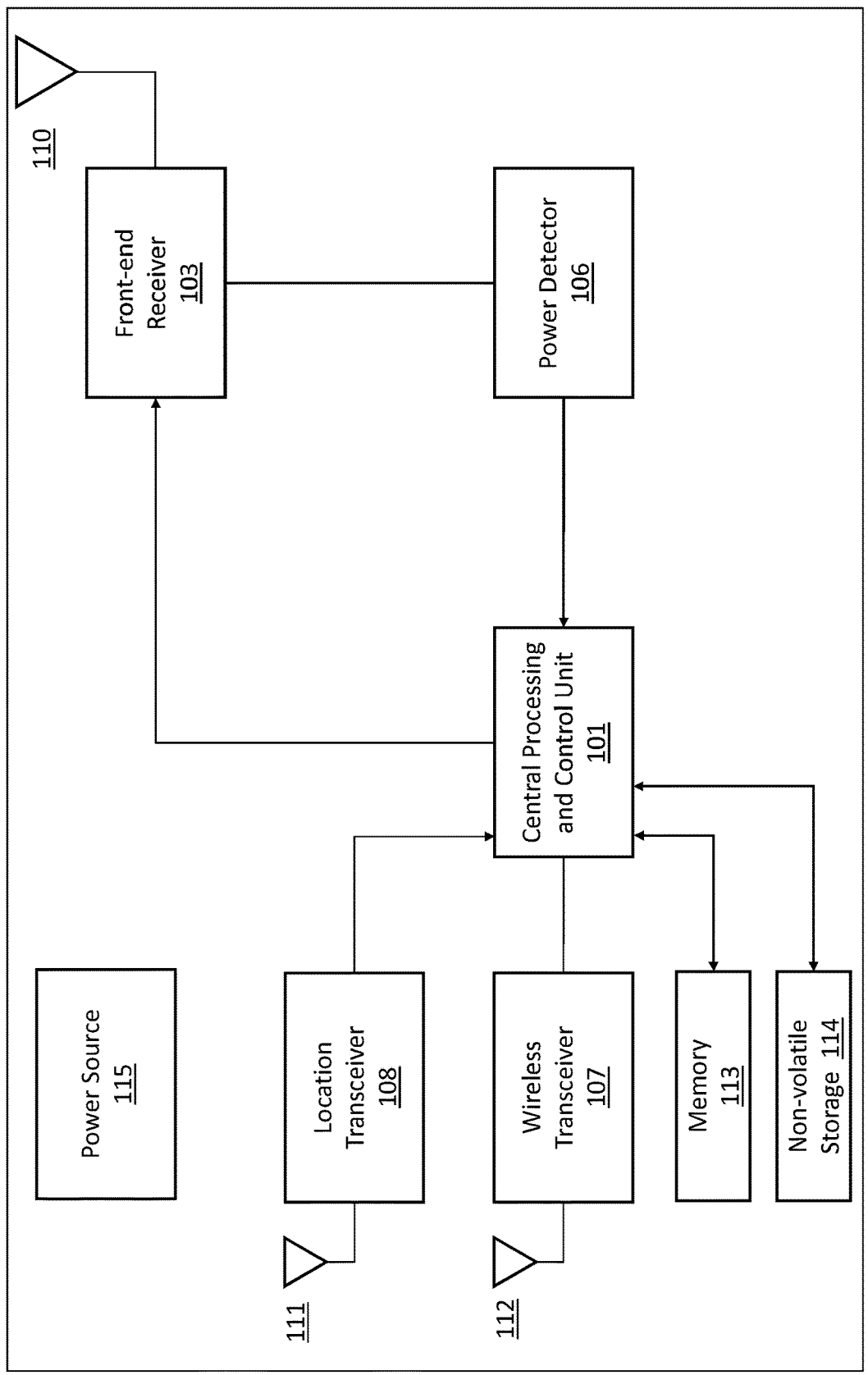
FIG. 3B illustrates a second embodiment of a wireless sensor module unit according to one or more aspects of the disclosed subject matter.

In another embodiment as illustrated in FIG. 3B, wireless sensor 100 senses the RF environment in a specified frequency band, centered on frequency f0, with a finite frequency spectrum bandwidth BW around frequency f0. By way of example, using the spectrum depicted in FIG. 1 for illustration, wireless sensor 100 is configured to sense the integrated radiative power level with center frequency f0 of 24.30 GHz, with frequency bandwidth of 100 MHz, being the bandwidth of the spectrum block(s). The central processing unit 101 receives information on the RF operating parameters of the first network at 24.30 GHz, such as of the center frequency 24.30 GHz and frequency bandwidth being 100 MHz, through a wireless transceiver 107. Such information is provided by local/cloud controller 205, or may reside in multi-radio AP 201. The wireless transceiver 107 includes a transmitter and a receiver, which can be of any wireless technologies suitable for local or wide area network such as Wi-Fi, Bluetooth, LoRa, Sigfox, 802.15.4, cellular 3G/4G/5G. The central processing and control unit 101 compares the received center frequency 24.30 GHz and frequency bandwidth 100 MHz with a look-up table stored in the non-volatile storage 114 and retrieves corresponding control voltages Vf0 and Vbw for the center frequency 24.30 GHz and frequency bandwidth 100 MHz, respectively. The central processing and control unit 100 applies the Vf0 and Vbw to the front-end receiver 103 to tune the tunable RF bandpass filter to operate at 24.30 GHz with frequency bandwidth of 100 MHz. The power detector 106 in the second embodiment is an RMS RF power detector that has a large dynamic range and detects RF signal power over a wide mm-wave frequency band. Thus, the RF signal at frequency 24.30 GHz is directly captured and converted to an equivalent voltage level. The power meter 106 provides this voltage level to central processing and control unit 101.

The wireless sensor 100 further includes a location transceiver (or other source of location information such as calculated or triangulated information as to the geolocation of the sensor) 108, which can be any of the real-time location (RTL) and location detection technology used for outdoor or indoor such as Global Positioning System (GPS), BLE RTL, UWB, and Wi-Fi. In an embodiment, the location transceiver 108 is a Bluetooth beacon that is broadcasting its location to a Bluetooth receiver residing in the multi-radio access point 201. In another embodiment, the location transceiver is a Wi-Fi transceiver that is transmitting beacon messages to the Wi-Fi radio of the multi-radio access point 201 in order for the multi-radio access point or controller 205 to compute the channel state information between the two Wi-Fi radios. A change in the any of the radios position result in a change in the channel state information and thus location can be derived from channel state data.

It should be noted that FIG. 3A and FIG. 3B are merely two examples of embodiment and are intended to illustrate the types of elements that may be present in the wireless sensor 100.

Figure 4:
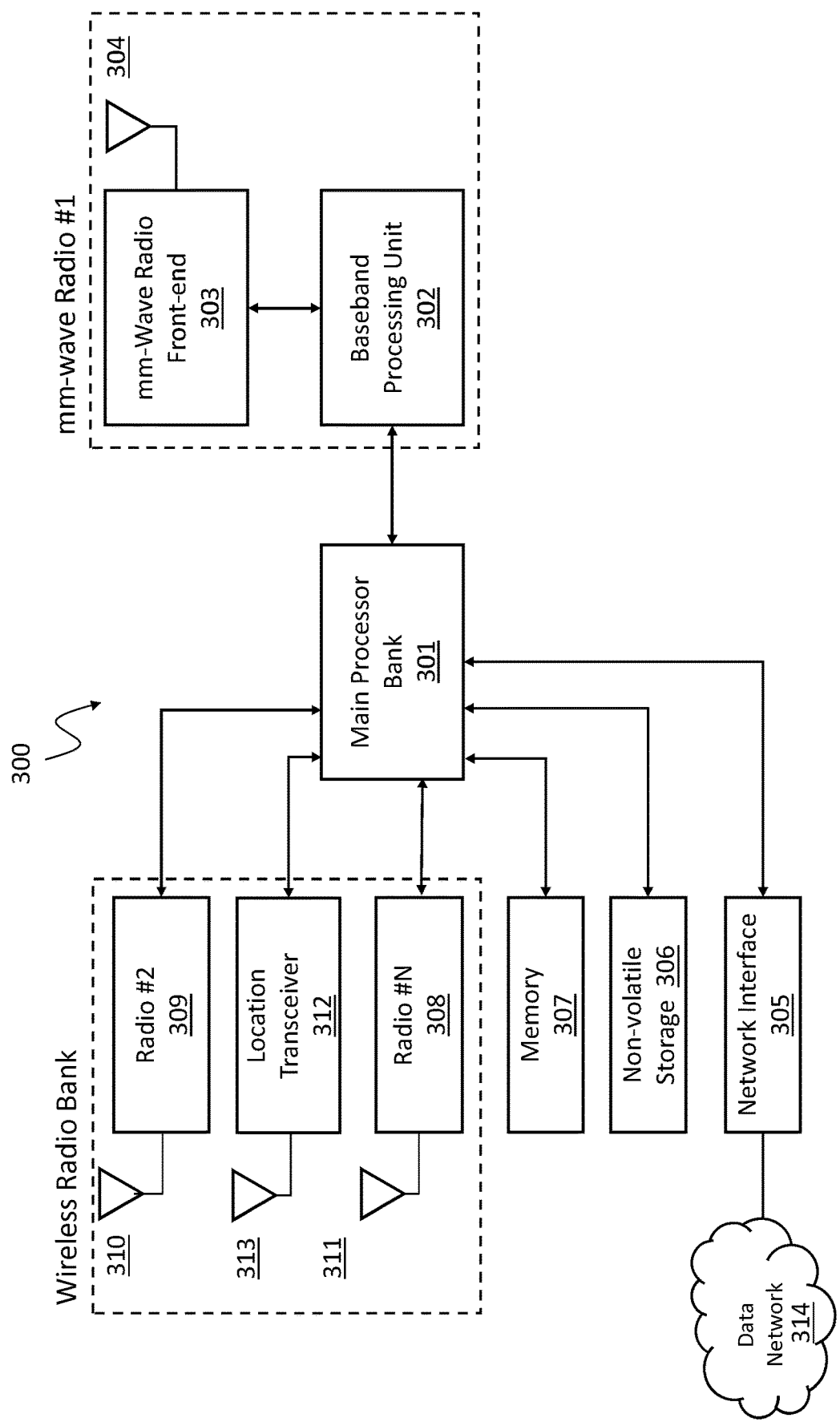
FIG. 4 illustrates a multi-radio access point according to one or more aspects of the disclosed subject matter.

FIG. 4. Illustrates a block diagram 300 of a multi-radio access point 201 including a main processor bank 301; mm-wave radio #1; a wireless radio bank comprising multiple radios including Radio #2 309, Radio #N 308, location transceiver 312, and antennas 310, 311, and 313; memory 307; non-volatile storage 306, and a network interface 305. The multi-radio access point architecture depicted in FIG. 4 implements a method to provide wireless connectivity using at least two radios, wherein a first radio is a mm-wave radio that operates on a first protocol such as fifth-generation (5G) or six-generation (6G) standards protocol in licensed mm-wave spectrum band such as 24 GHz, 28 GHz or beyond, and at least a second radio that operates on a second protocol such as Wi-Fi and unlicensed spectrum band such as 2.4 GHz, 5 GHz, or 6 GHz. It is a feature of this multi-radio access point 201 architecture that one or a plurality of multi-radio access points 201 permits substantial overlay of two wireless networks, wherein the first radio network operates on licensed/sub-licensed mm-wave spectrum f0 to provide high-speed wireless connectivity to user devices, and the at least second radio network operates on unlicensed Wi-Fi spectrum to provide wireless connectivity to sensors 100 that monitor and provide control data for management of the first radio network.

The main processor 301 comprises one or multiple processors that interface with and provide control to the first mm-wave radio, and second Wi-Fi radios and any other radios, memory and storage, and network interface. The processors are used to implement operational software, instructions, local or distributed functions for the management of the mandatory and optional functions of the first mm-wave radio and the wireless radio bank comprising of the second Wi-Fi radio and additional radios. The processors also implement the necessary communication protocols to interface with the other network elements in the wireless backbone network and wireless user devices.

The first mm-wave radio comprises: a baseband processing unit 302, a mm-wave radio front-end 303, and a wideband mm-wave antenna 304. The baseband processing unit 302 includes hardware elements and software components to implement the physical layer baseband processing, link layer functions and access control layer functions of mm-wave 5G or 6G protocol or other protocol. The mm-wave radio front end 303 comprises of mm-wave hardware transmitting and receiving components such as power amplifier, low-noise amplifier, mixer, local oscillator, filters, transmit/receive switch, and coupler. Some part of the transmitting or receiving components can be controlled and programmed by the main processor 301 to operate over a wide range of frequencies in the requisite mm-wave frequency spectrum band such as 24 GHz, 28 GHz bands or higher frequency. In an embodiment the wideband mm-wave antenna 304 includes one or more than one radiating element(s) to provide a directive radiation pattern. The radiating element can be linear or circular polarized and be of any standard PCB-manufacturing form such as, but not limited to printed dipole, microstrip patch, slot, or substrate integrated waveguide (SIW).

The wireless radio bank comprises of one or more than one wireless radio operating in the same or different wireless technologies such as Wi-Fi, LoRA, Bluetooth, BLE, Sigfox. Each radio in the wireless radio bank interfaces with a processor in the processor bank 301. A purpose of the radios in the wireless radio bank is to enable wireless sensors 101 to be connected, using the most preferred wireless technology for the deployment situation. More than one radio can interface with a single processor. In an embodiment, one of the radios of the radio bank is a Wi-Fi radio and has a PCIe interface with a processor.

The network interface 305 provides one or more physical and/or logical interfaces between processors in the processor bank 301 and one or more data network 314. The network interface is used to receive and transmit from the data network 314 the data plane information to be transmitted to or received from user devices connected to the first mm-wave radio, or from wireless sensors connected to the second Wi-Fi radio, and control plane information to control and manage, via the process bank 301, multi-radio access point 201. In an embodiment, the network interface 305 is connected to an optical or twisted pair cable using Common Public Radio (CPRI) or enhanced-CPRI (eCPRI) and/or Ethernet interfaces/protocols.

Figure 5:
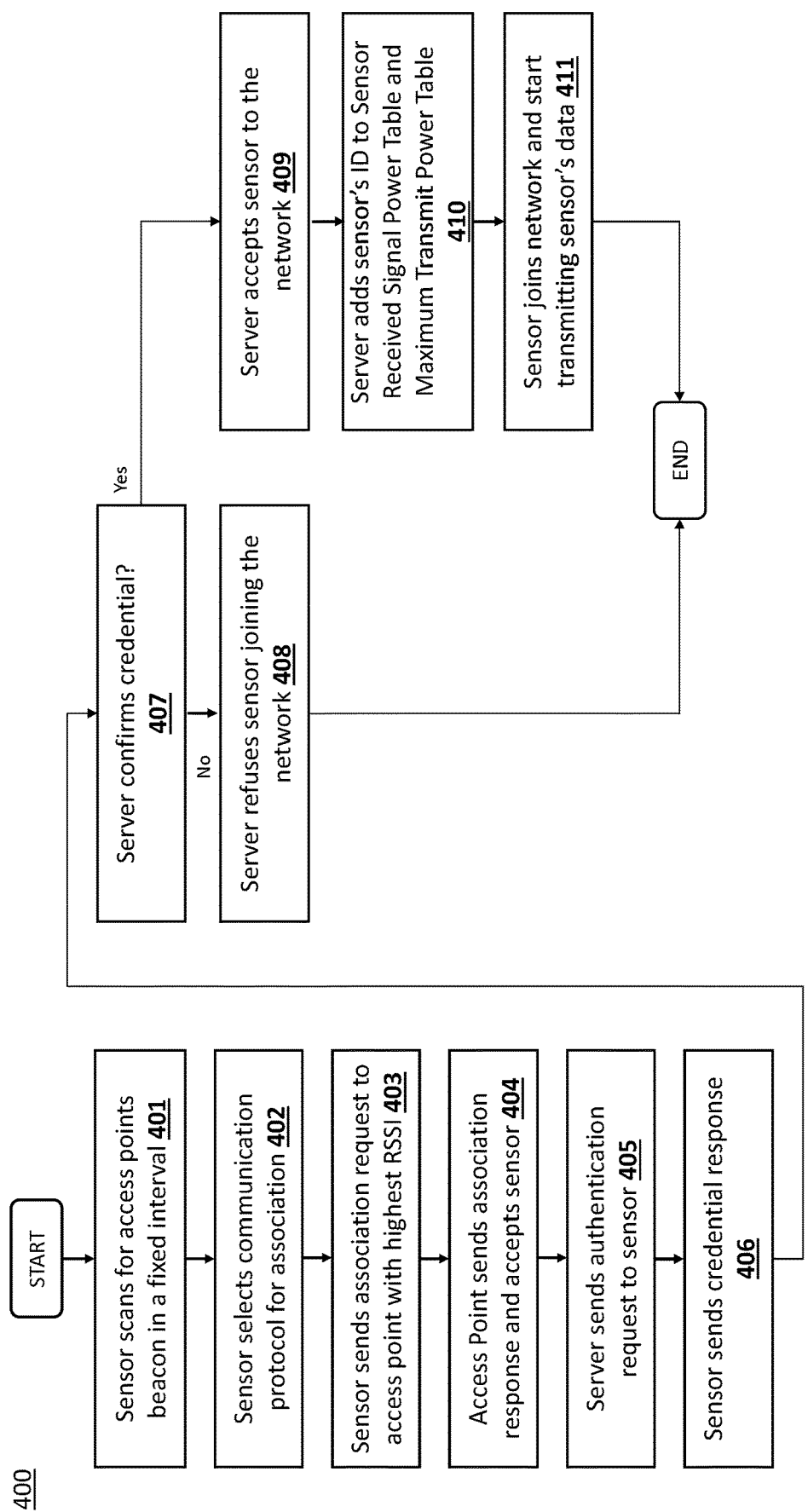
FIG. 5 illustrates a sensor authentication process according to one or more aspects of the disclosed subject matter.

FIG. 5. illustrates a block diagram of an authentication process 400 of a wireless sensor 100 joining a wireless sensor network of FIG. 2. A formal process of sensor authentication ensures network security at device level and rejects rogue sensors that are not intended or authorized from being connected to the multi-radio access point 201. At 401, when a new sensor 100 is first installed and initialized the sensor 100 activates its wireless transceiver(s) 308, 309 and scans for multi-radio access point 201 within connection range over a fixed time interval. In some embodiments, this fixed time interval can be a multiple of a beacon period, for example 500 ms or 1000 ms. This is to ensure the sensor 101 does not miss the opportunity to associate with any access points 201. At 402, based on received beacon, sensor 100 selects the suitable wireless transceiver and communication protocol for association. In an embodiment, the sensor's wireless transceiver 308, 309 operates in Wi-Fi mode. The network ID of the Wi-Fi beacon is unique and, in some scenarios, may be hidden to increase security. In an embodiment, sensors 101 can be preprogrammed bearing credentials to associate with a multi-radio access point 201 configured to recognize the custom specific network ID. The proximity of the closest multi-radio access point 201 to a given sensor 101 is detected by, for example, the level of received signal strength (RSS) of the broadcasted Wi-Fi beacon. At 403, the sensor 100 sends association request to the closest multi-radio access point 201. At 404, the closest multi-radio access point 201 sends association response, verifying credentials of the sensor 100, and accepts sensor 100 to connect to the access point 201. The multi-radio access point 201 thus acts as a connection bridge for the wireless sensor 101 to the network controller 205. At 405, the network controller 205 requests authentication from the sensor 100. At 406, upon receiving the authentication request packet, the sensor 101 replies with its credential. In some embodiments, this credential can be a unique key generated for the sensor 101 during its manufacture and embedded in the firmware of the sensor 101. At 407, the network controller 205 verifies the sensor's credential with its database of valid sensors and determines if the sensor should be authenticated to the wireless sensor network. At 409, the verification is positive, network controller 205 accepts sensor 101 and subsequently adds sensor's ID to the Sensor Received Signal Power Table (Table 1) and the Maximum Transmit Power Table (Table 2). At 411, the sensor 101 joins the wireless network and starts transmitting its sensor data to the network controller 205.

TABLE 1

| Sensor ID# | $P_{RX}$[dBm] | Correction Factor | ΔP |
|---|---|---|---|
| Sensor 1 | | | |
| Sensor 2 | | | |
| ... | | | |
| SensorN − 1 | | | |
| Sensor N | | | |

| Sensor ID# | AP#1 $P_{TX}$ [dBm] | AP#2 $P_{TX}$ [dBm] | AP#N $P_{TX}$ [dBm] |
|---|---|---|---|
| Sensor 1 | | | |
| Sensor 2 | | | |
| ... | | | |
| SensorN − 1 | | | |
| Sensor N | | | |

Figure 6:
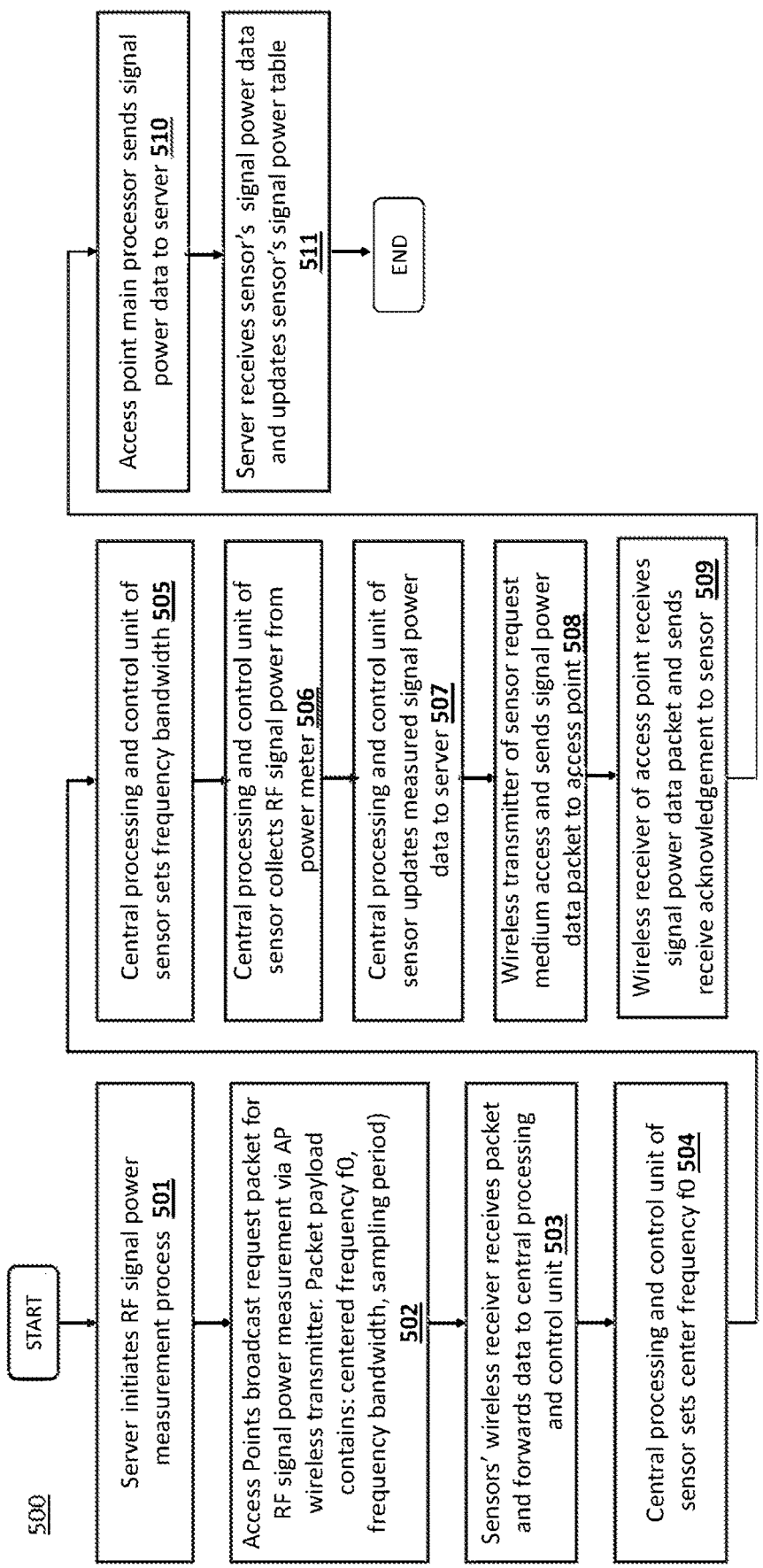
FIG. 6 illustrates a sensor RF signal power measurement process according to one or more aspects of the disclosed subject matter.

FIG. 6. illustrates a block diagram of a wireless sensor RF signal power measurement process. The purpose of this process is to enable a record of the RF signal power measured by each of a plurality of wireless sensors 100. One or more than one wireless sensor 100 can be operated within the sensor network. In some deployments, where the private wireless network at frequency f0 operates within walls of a building, some wireless sensors 100 can be deployed with the walled interior of the building, while other wireless sensors can be deployed at or beyond the exterior wall of the building.

In an embodiment as illustrated in FIG. 2, the wireless sensor 100 utilizes two types of radios, wherein the first radio is a mm-wave radio operating in a licensed mm-wave frequency f0 and the second radio is a Wi-Fi radio operating in a Wi-Fi channel in one of the unlicensed 2.4 GHz, 5 GHz or 6 GHz bands. In this embodiment, the primary function of the wireless sensor's 100 first mm-wave radio is to sense RF signal present at frequency f0, whereas the primary function of the wireless sensor's second Wi-Fi radio is to provide wireless connectivity to a multi-radio access point 201. In one embodiment the sensor's Wi-Fi radio is programmed to connect to and communicate its data to only one multi-radio access point 201.

After a secure connection is established between wireless sensor 100 and the network controller 205 such as in sensor authentication process of FIG. 5, the network controller 205 (or the multi-radio access point 201) initiates a signal power measurement process 501. The purpose of the RF Signal Power Management Process, as exemplified in FIG. 6., is to enable the sensor 100 to establish the baseline RF signal power at frequency f0, at the specific fixed locations of both the multi-radio access point 201 and wireless sensor 101, that is to be used for calibration and control functions of the wireless sensor network. Upon connection, and then initiation 501 of the RF Signal Power Management Process, multi-radio access point 201 sends parameter data to the wireless sensor 101, including at least: frequency f0, frequency bandwidth BW, and sampling period, to inform the wireless sensor 101 how to configure its mm-wave front end elements 102-105, for sensing operations, 503-506. Sensor 100 then collects RF signal power from power meter 106, 506, and sends the data to network server 205, via its connection to the access point 201, 507-510. This process is repeated with respect to each wireless sensor 100 connected to the same multi-radio access point 201, to establish a reference table, of RF signal power at f0, based on the fixed locations of each multi-radio access point 201, and its connected sensors 100.

We now expand on the method of FIG. 6, in relation to the embodiment of wireless sensor 100 in FIG. 3A. At 502, multi-radio access point 201 Wi-Fi radio sends a power measurement request packet to an associated wireless sensor 100. The payload of the power measurement request packet includes, among other things, the information for wireless sensor 100 to perform a measurement such as the mm-wave frequency f0, the frequency bandwidth, and sampling period. At 503, the wireless sensor's central processing and control unit 100 receives the request packet via wireless sensor's Wi-Fi radio 107. At 504, the central processing and control unit 101 controls the programmable frequency synthesizer 102, to generate the mm-wave frequency f0 to be applied to the local oscillator (LO) port of the down-converting mixer 104. At 505, the central processing and control unit controls the frequency tunable lowpass filter 105 to select the same baseband bandwidth as per request packet. In the preferred embodiment, the bandwidth is discrete 50 MHz, 100 MHz, 200 MHz or 400 MHz and thus the frequency tunable lowpass filter can be implemented as discrete selectable filter banks. At 506, the central processing and control unit 101 receives power level of received mm-wave signal of frequency f0 presented at antenna 110. Depending on the installed location of the wireless sensor 100, i.e. interior or exterior, the central processing and control unit applies an appropriate correcting factor to the received power level to reflect the actual signal level at the edge of the territory of the private wireless network operating at frequency f0. This correcting factor represents the loss either due to material absorption at f0, and a path loss model taking account of other losses. The correcting factor may be empirically determined by measuring the path loss between sensor 100 and multi-radio access point 201 or may be applied from standard models such as use scenarios per 3GPP TR 38.901 model. At 507, the central processing and control unit updates the received signal power level to the server. The server update process is performed via the second Wi-Fi radio of the multi-radio access point 201 and the Wi-Fi radio of the wireless sensor. At 508, the sensor Wi-Fi radio requests medium access and sends packet containing sensor's data to the multi-radio access point's second Wi-Fi radio. At 509, multi-radio access point Wi-Fi radio receives the data and sends acknowledgement to sensor to confirm its receipt of data. At 510, the processor of main process bank 301 that interfaces with Wi-Fi radio forwards the sensor's data to the server via network interface 305. At 511, the server receives sensor's data and updates the sensor's received signal power table entry point corresponding to the sensor ID.

We now expand on the method of FIG. 6, in relation to the embodiment of wireless sensor 101 in FIG. 3B. At 502, multi-radio access point 201 Wi-Fi radio sends a power measurement request packet to an associated wireless sensor 101. The payload of the power measurement request packet includes, among other things, the information for wireless sensor 100 to perform a measurement such as the mm-wave frequency f0, the bandwidth, and sampling period. At 503, the wireless sensor's central processing and control unit 101 receives the request packet via wireless sensor's Wi-Fi radio 107. At 504, the central processing and control unit controls the front-end receiver 103, to select the same baseband bandwidth as per request packet. In the preferred embodiment, the bandwidth centered on f0 is discrete 50 MHz, 100 MHz, 200 MHz or 400 MHz and thus the frequency tunable bandpass filter can be implemented as discrete selectable filter banks to cover a portion of or all of the (for example 24 GHz) relevant mm-wave frequency band. At 506, the central processing and control unit receives power level of received mm-wave signal of frequency f0 presented at antenna 110. Depending on the installed location of the wireless sensor 101, i.e. interior or exterior, the central processing and control unit applies an appropriate correcting factor to the received power level to reflect the actual signal level at the edge of the territory of the private wireless network operating at frequency f0. This correcting factor represents the loss either due to material absorption at f0, and a path loss model taking account of other losses. The correcting factor may be empirically determined by measuring the path loss between sensor 100 and multi-radio access point 201 or may be applied from standard models such as use scenarios per 3GPP TR 38.901 model. At 507, the central processing and control unit updates the received signal power level from detector 106 to the server. The server update process is performed via the second Wi-Fi radio of the multi-radio access point 201 and the Wi-Fi radio of the wireless sensor. At 508, the sensor Wi-Fi radio requests medium access and sends packet containing sensor's data to the multi-radio access point's second Wi-Fi radio. At 509, multi-radio access point Wi-Fi radio receives the data and sends acknowledgement to sensor to confirm its receipt of data. At 510, the processor of main process bank 301 that interfaces with Wi-Fi radio forwards the sensor's data to the server via network interface 305. At 511, the server receives sensor's data and updates the sensor's received signal power table entry point corresponding to the sensor ID.

Figure 7:
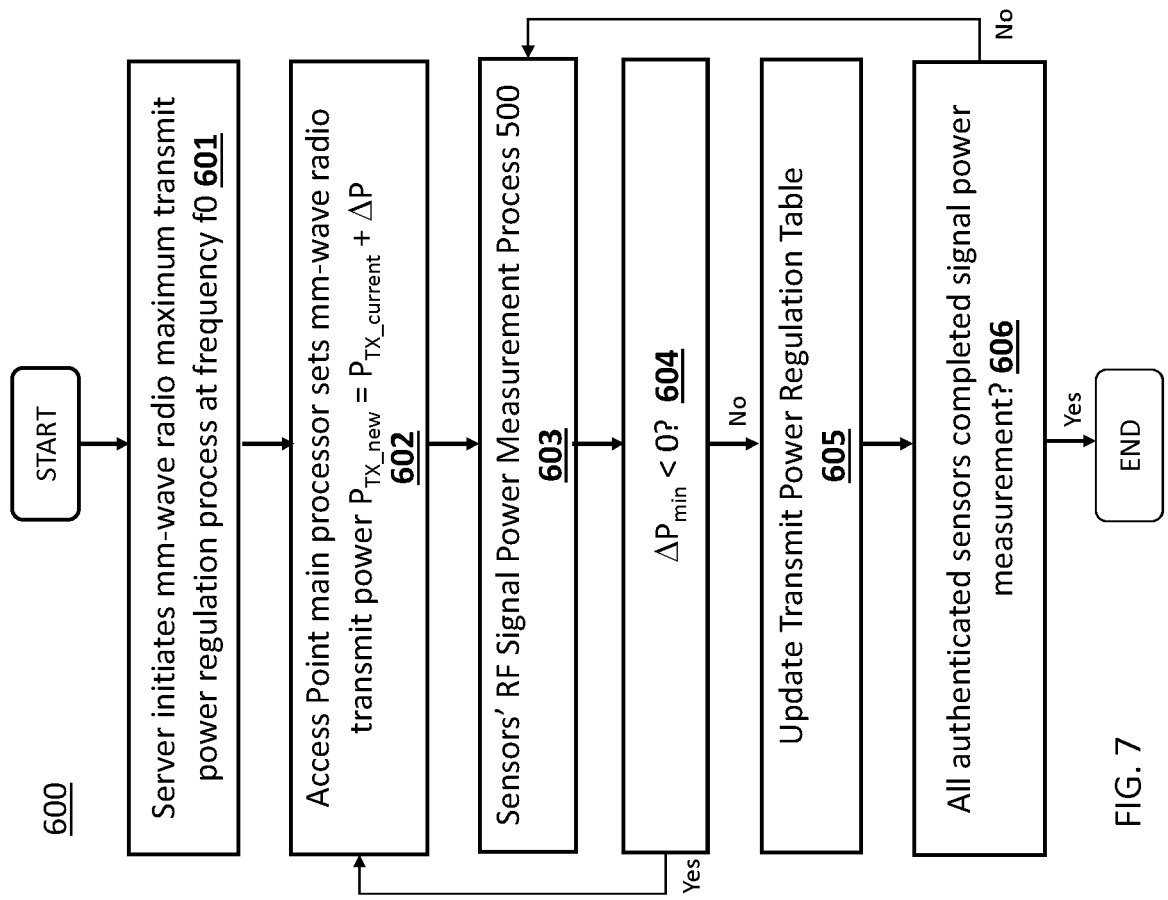
FIG. 7 illustrates a mm-wave radio maximum transmit power regulation process according to one or more aspects of the disclosed subject matter.

Once the wireless sensor 100 network of FIG. 2 is deployed, and active, the wireless sensor network is able to ready to commence sensing operation at frequency f0. The architecture of this disclosure as depicted in FIG. 2, and the methods disclosed herein, enable mm-wave radios in a mm-wave private wireless network to be operated under a power operating limit using continuous monitoring and control data (i.e. operating frequency f0 and mm-wave radio transmit power at f0) using the wireless sensor network for the management of private wireless network at f0. FIG. 7 depicts the first step of a process to activate and operate a private wireless network at f0 by establishing, for private network owners or operators of the mm-wave radio of multi-radio access point 201, the maximum transmit power of a mm-wave radio operating at f0 to combat the high inherent path loss at mm-wave spectrum within the coverage territory of the private network. While the maximum transmit power for a RF emitting device must always be lower than any applicable regulatory limit, such as set by the FCC in the United States, there may be another stricter operating power limit that is to be met (e.g. a limit set directly or indirectly by the spectrum owner or primary licensor e.g. via a sublicense to the private network owner or operator) to ensure that there is sufficiently low interference between the emissions from that radio (and thereby a private network that it enables) operating at f0 and other (e.g. public) networks situated in the same geographical area of the primary spectrum license also operating at f0 that are outside the territory of the private network coverage area (such as the network coverage area permitted by a spectrum sublicense for operating one or more radios at mm-wave frequency f0), that both networks can co-exist without deleterious impact by one network on the operation of the other network.

In the situation where the private network is deployed under a spectrum sublicense for f0 the terms of the spectrum sublicense may require each mm-wave radio at f0 to be operated at a signal power that is a maximum under the specific deployment scenario. This upper threshold power limit may be specified directly, or it may be specified indirectly. An indirect specification may arise, for example, if the sublicense requires a maximum allowable signal power density at the edge of a defined region under which the private wireless network can operate at f0, thereby requiring a determination of the maximum operable transmit power of one or more radios while meeting the received power threshold at the private network edge.

The power regulation process of FIG. 7 involves measuring signal power level at f0 by wireless sensors installed at or near the network edge and enables a determination of the maximum transmit power of each mm-wave radio that is installed within the perimeter of the private network operating geographical or building walls boundary that may be prescribed by a sublicense. The process essentially involves steps to establish the operating power of the mm-wave radios when all are operating at the same time. This "worst case" condition then ensures that the mm-wave radios (and the network as a whole) are within prescribed operating limits when operating at f0, and that the private network is sufficiently RF isolated from others outside the operating boundary.

At 601, the server/controller 205 initiates the power regulation process. Information for this maximum power may reside in the cloud server/network controller 205 or may be downloaded to local storage 306 of the multi-radio access point 201. At 602, the access point main processor 301 sets the mm-wave radio transmit power to a new transmit power level which is computed by adding the current transmit power level and ΔP, where ΔP is the difference in power between threshold power PTHRES and wireless sensor's received power PRX, given as follows:

$$PTX\_\text{new} = PTX\_\text{current} + \Delta P [\text{dBm}] \qquad \text{Eq. 1}$$

$$\Delta P = P\text{THRES} - PRX [\text{dB}] \qquad \text{Eq. 2}$$

In the case of a positive ΔP, i.e. sensor's received power is less than threshold power, the new transmit power level will be increased by ΔP from the current transmit power. On the contrary, where ΔP is negative, the new transmit power level will be decreased. During the system initialization (the first time the mm-wave radio in the multi-radio access point is turned ON), the default current transmit power is set to an initial value and ΔP=0. In an embodiment, in an indoor environment, the initial value is a suitably low preset value, such as 1 W (30 dBm). In another embodiment the initial value may be assigned by the server at system initialization based on the specific geolocation of the multi-radio access point and any terms of a spectrum sublicense that apply to operation of radios at f0.

After setting a new transmit power for mm-wave radio of any given multi-radio access point, the main processor starts the RF signal power measurement process at all wireless sensors that are within the coverage range and can listen to the measurement request packet. For those wireless sensors that do not hear the measurement request packet, it is most likely that those wireless sensors are outside of the range of the multi-radio access point, whose new transmit power is being applied. At 603, the wireless sensors that receive measurement request packet initiate RF signal power measurement process 500 and reports its received power data. The server updates the sensor received signal power table and computes the ΔP for each sensor. In an embodiment, one or more than one sensor is associated with a multi-radio access point 201, therefore the ΔP will be the minimum of ΔP of sensors that are associated with a given multi-radio access point 201. Thus, Eq. 2 will be re-written as follows.

$$\Delta P \text{ min} = \min\{\text{associated\_sensor}(\Delta P1, \Delta P2, \ldots \Delta PN)\} \quad \text{Eq. 3}$$

where ΔPj, j=1, 2, . . . N is computed as Eq. 2 for sensor j. Note that for the case of only one sensor associated with a multi-radio access point, Eq. 3 is equivalent to Eq. 2.

At 604, if ΔPmin is less than 0, the power regulation goes back to 602 and sets a new transmit power for mm-wave radio at f0. Since ΔPmin is less than 0, the new transmit power is lower than the current transmit power. By lowering the current transmit power by ΔPmin, it ensures that power compliance limit condition is being met at all the associated sensors. At 605, the server updates the transmit power regulation table. These newly obtained transmit power levels are maximum operating transmit power for mm-wave radios of the private wireless network. At 606, the server verifies if all authenticated sensors have performed the requested signal power measurement.

In an embodiment, each of the multi-radio access points 201 have a first (mm-wave) radio operating at frequency spectrum f0 and transmitting power PTX to provide high bandwidth, low latency connectivity to a set of user devices operating at f0 and at least a second (Wi-Fi) radio from the wireless radio bank to provide connectivity to a plurality of wireless sensors constellated around each multi-radio access point 201 each at a distance that extends to and just beyond the proximate edge of the permitted operating boundary of radios transmitting at frequency f0, and monitor and provide control data information via the multi-radio access point 201 for management of the first (mm-wave) radio in the same multi-radio access point containing the second (Wi-Fi) radio.

In another embodiment, the second Wi-Fi radio can provide low bandwidth connectivity to another set of user devices that may not be in a clear line of sight to the multi-radio access point 201 or may not need the superior connectivity speed provided by the first mm-wave radio. In other embodiments, a third radio from the wireless radio bank can be activated and operate in wireless standard protocol such as Wi-Fi, BLE, LoRaWAN, Sigfox to provide additional network capacity in other spectrum bands (in the case of Wi-Fi) and/or other protocols for low power applications such as asset tracking, location-based service in the case of BLE or LoRaWAN.

It should be appreciated that the multi-radio access point and the network architecture of FIG. 2 allows a concurrent and seamless interoperation of two overlay networks, wherein the first private network provides data network connectivity service to user devices on a spectrum f0 that is licensed (or sublicensed) and subject to operating constraints including but not limited to a network boundary region, with network compliance monitoring of the first network enabled by the second network of wireless sensor devices.

Network compliance, especially RF signal power level compliance, is an importance aspect of private wireless network operation and compliance should be regularly monitored, continuously monitored at all times, or specifically monitored at times, to avoid and ensure there is no interference, intentionally or unintentionally, between private and public networks. More particularly, the data obtained from the monitoring operation can used to deactivate specific radios operating at f0 within or specific multi-radio access points 201 if the monitoring data shows the radio has exceeded the terms of its radio operation or a service level agreement between primary spectrum licensor and sublicensor/microoperator.

Figure 8:
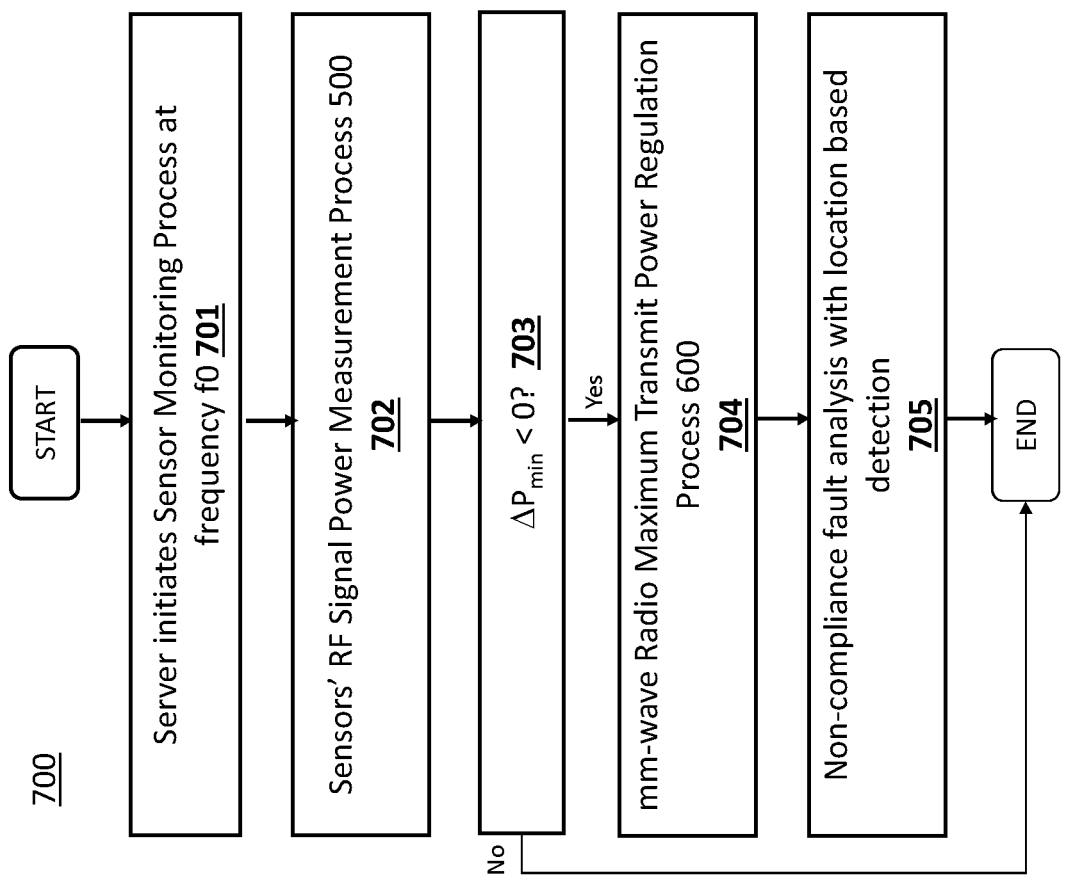
FIG. 8 illustrates a sensor monitor process during Wireless Private Network Operation according to one or more aspects of the disclosed subject matter.

The RF condition of a private wireless network can also change during operation if new multi-radio access points 201 are being added to provide capacity or coverage, the multi-radio access points 201 are translocated after power regulation has occurred, or the building structure or furniture being added to or removed from the physical area. These environment changes can cause directly, for example adding more multi-radio access points 201, or indirectly, for example removing a boundary wall, the RF signal power density at the network edge to exceed the regulatory limit or operation limit and violate compliance requirements and result in unintended signal interference with other networks beyond the private wireless network edge. It is therefore desirable to continuously monitor the RF signal power at the network edge. In an embodiment, with reference to FIG. 2, an approach is depicted in FIG. 8 where a network uninterrupted monitoring process is illustrated. At 701, the server initiates wireless sensor monitoring process at network operating frequency f0. This process can be pre-programmed by private wireless network owner or operator such as to be autonomously executed over a predefined time interval. Such time interval can be set, for example, as per service level agreement (SLA) between private wireless network microoperator and licensor. At 702, the RF signal power measurement process 500 as illustrated in FIG. 6 starts and sensor data in the sensor received signal power table is updated. Unlike the measurement performed during power regulation process where private wireless network has not begun operation, the measurement performed during monitoring process is during live network operation. It is the design architecture of the wireless sensor 100 disclosed for example in FIG. 3a or FIG. 3b that the mm-wave signal sensing does not interrupt the operation of the first mm-wave radio of the multi-radio access point 201 as the sensor's mm-wave sensing radio circuitry is in a receive-only mode and more importantly, the sensor's mm-wave radio does not associate with the mm-wave radio of the multi-radio access point 201. However, the sensor itself is associated with the multi-radio access point 201 via its second Wi-Fi radio, therefore, the entire sensor RF signal measurement (sampling at f0) and data update (transmitting via Wi-Fi radio) do not interrupt the mm-wave radio operation. This symbiotic relationship between the two networks can be exploited to enforce strict compliance. For example, if one or more sensors 100 fail to operate (for example, because of loss of power, or for any other circumstance), or are translocated after power regulation and association with the access point 201 without consent, then the multi-radio access point 201 will receive a signal from the network controller 205 to revoke operation of the radio(s) operating at f0. In another example, if during operation sensors 100 provides measured data that indicate the transmit power of a radio operating at f0 exceeds a permitted power threshold, the server/network controller 205 sends a signal to adjust the power of the radio in the manner described above, or if more strictly required to signal a cessation of the mm-wave radio operation in the multi-radio access point, 201. At 703, the server/network controller computes, based on the new received signal power PRX, the value of ΔP for all sensors installed in the private wireless network. Condition ΔPmin≥0 must be met to satisfy the compliance at all monitored sensors' location. At 704, as the result of non-compliance signal detection, the server initiates the power regulation process 600 in order to set a new maximum transmit power level for the mm-wave radio. During the power regulation process, wireless connectivity service will only be interrupted locally for the affected multi-radio access point while the remaining areas of the private wireless network operate normally. At 705, a non-compliance fault analysis is performed with location-based detection algorithm using data collected from location receiver of the wireless sensor or Wi-Fi channel condition between the affected multi-radio access point and each associated sensor. The fault analysis is able to predict, with a high level of sensitivity, whether the multi-radio access point 201 or the sensor(s) 100 or both has been translocated (relocated, rotated) or otherwise if the environment has been altered in a manner that requires radio power adjustment.

In the above description of FIGS. 5-8, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A wireless networking infrastructure, comprising:
    at least one multiple radio access point or base station including
        at least one radio that operates on a first radio communications protocol at a first frequency spectrum, and
        a second radio that operates on a second radio communication protocol at a second frequency spectrum;
    at least one remotely deployable wireless sensor including
        at least one wireless sensor sensing radio frequency parameters at the first frequency spectrum of its vicinity, and
        a transceiver that transmits and receives radio communications at the second frequency spectrum; and
    a wireless network controller configured to
        establish connection with one or more of the at least one multiple radio access point or base station to form a wireless network operating at the first frequency spectrum,
        configure one or more of the at least one remotely deployable wireless sensors to sense one or more radio frequency parameters at the first frequency spectrum,
        receive radio frequency parameter data from the one or more remotely deployable wireless sensors via the at least one multiple radio access point or base station,
        establish specific geolocations of the at least one multiple radio access point or base station and of the at least one remotely deployable wireless sensor, and
        receive and store radio operating parameters for radios operating at the first frequency spectrum at the specific geolocations.

2. The wireless networking infrastructure of claim 1, wherein the first radio is a 5G capable radio operating at the first frequency spectrum which falls within at least one of operating frequencies of one or more licensed millimeter wave frequency bands at its geolocation.

3. The wireless networking infrastructure of claim 1, wherein the second radio is a Wi-Fi radio at the second frequency spectrum which falls within one of the unlicensed Wi-Fi frequency bands applicable at its geolocation.

4. The wireless networking infrastructure of claim 1, wherein the radio operating parameters are licensed radio operating parameters.

5. The wireless networking infrastructure of claim 1, wherein the radio operating parameters are sub-licensed radio operating parameters.

6. The wireless networking infrastructure of claim 1, wherein the wireless network controller is further configured to perform authentication of a wireless sensor joining the wireless sensor network.

7. The wireless networking infrastructure of claim 1, wherein the wireless network controller is further configured to determine a maximum transmit power of each mm-wave radio that is installed within a perimeter of a private network prescribed by a sublicense.

8. A method of deploying a licensed spectrum wireless network, comprising:
    deploying at least one multiple radio access point or base station having a first radio operating at a licensed frequency and at least one a second radio operating at an unlicensed frequency within a territory of a license or sub-license to licensed radio frequency;
    sensing, by a plurality of remote wireless sensors, one or more radio frequency parameters at the licensed frequency;
    establishing geolocations of the at least one multiple radio access point or base station;
    establishing the geolocations or locations of the plurality of remote wireless sensors relative to the at least multiple radio access point or base station;
    using radio frequency parameter data from the plurality of remote wireless sensors to determine upper operating bounds of the at least one multiple radio access points or base stations operating at the licensed frequency at its specific geolocation in accordance with an applicable radio spectrum license or sub-license operating term; and
    configuring or reconfiguring the at least one multiple radio access point or base station so as to operate within the upper operating bounds applicable to use of the licensed frequency at its specific geolocation.

9. The method of claim 8, further comprising:
connecting, by a wireless network controller, to and configuring the at least one multiple radio access unit or base station to operate at the licensed frequency and the unlicensed frequency;
configuring, by the wireless network controller, the plurality of remote wireless sensors to sense one or more radio frequency parameters at the licensed frequency;
receiving, by the wireless network controller, radio frequency parameter data from the plurality of remote wireless sensors via the at least one multiple radio access point or base station;
establishing and maintaining a persistent record of radio frequency operating compliance of the at least one multiple radio access point or base station at the licensed frequency.

10. The method of claim 9, further comprising:
receiving radio frequency parameters applicable to the radio frequency license or sublicense at the licensed frequency at the specific geolocation of the at least one multiple radio access point or base station.

11. The method of claim 10, further comprising:
determining, using the radio frequency parameter data from one or more of the remote wireless sensors, the radio frequency operating characteristics of the at least one multiple radio access point or base station at the licensed frequency.

12. The method of claim 11, further comprising:
establishing whether one or more of the at least one multiple radio access point or base station operating at the licensed frequency exceeds the radio frequency upper operating bounds or the radio spectrum license or sub-license operating terms applicable to the licensed frequency at its geolocation.

13. The method of claim 12, further comprising:
establishing whether the at least one multiple radio access point or base station, or remote wireless sensors connected thereto, have been translocated.

14. The method of claim 13, further comprising:
approving, denying, or configuring the at least one multiple radio access point or base station to operate at the licensed frequency in accordance with the upper operating bounds applicable or radio spectrum license or sub-license terms at its specific geolocation.

15. The method of claim 14, wherein the plurality of remote wireless sensors are
physically located at one or more points proximate to the periphery of the permissible radio coverage area of the licensed spectrum wireless network; and
wirelessly connected, using the unlicensed frequency, to the at the least one multiple radio access unit or base station.

16. A wireless network controller, the wireless network controller having circuitry configured to
establish connection with one or more multiple radio access points or base stations to form a wireless network operating at a first frequency spectrum,
sense, by one or more remotely deployable wireless sensors, one or more radio frequency parameters at the first frequency spectrum,
receive radio frequency parameter data from the one or more remotely deployable wireless sensors via the one or more multiple radio access points or base stations,
establish specific geolocations of the one or more multiple radio access points or base stations and of the one or more remotely deployable wireless sensors, and
receive and store radio operating parameters for radios operating at the first frequency spectrum at the specific geolocations,
manage the configuration and operation of the one or more multiple radio access points or base stations.

17. The wireless network controller of claim 16, wherein the circuitry is further configured to perform authentication of one or more wireless sensors connecting to the one or more multiple access points or base stations operating at a second frequency spectrum.

18. The wireless network controller of claim 16, wherein the circuitry is further configured to determine a maximum transmit power of each mm-wave radio that is installed within a perimeter of a private network prescribed by a sublicense.

19. The wireless network controller of claim 16, wherein the one or more remotely deployable sensors are physically located at one or more points proximate to a periphery of a permissible radio coverage area of the first frequency spectrum, the first frequency spectrum being a licensed spectrum wireless network.

20. The wireless network controller of claim 16, wherein the one or more remotely deployable sensors are wirelessly connected, using an unlicensed frequency, to the one or more multiple radio access points or base stations.

* * * * *